United States Patent
Zhong et al.

(10) Patent No.: US 8,194,100 B2
(45) Date of Patent: Jun. 5, 2012

(54) ELECTRONIC DEVICE

(75) Inventors: Song Zhong, Guangdong Province (CN); Feng Gao, Guangdong Province (CN); Si-Jun Yi, Guangdong Province (CN); Wei-Feng Deng, Guangdong Province (CN)

(73) Assignee: Ali Corporation, Taipei (TW)

( * ) Notice: Subject to any disclaimer, the term of this patent is extended or adjusted under 35 U.S.C. 154(b) by 889 days.

(21) Appl. No.: 12/260,194

(22) Filed: Oct. 29, 2008

(65) Prior Publication Data

US 2010/0103179 A1    Apr. 29, 2010

(51) Int. Cl.
*G09G 5/00* (2006.01)
*G06F 15/16* (2006.01)

(52) U.S. Cl. .................. 345/629; 345/502

(58) Field of Classification Search .......... None
See application file for complete search history.

(56) References Cited

U.S. PATENT DOCUMENTS

| | | | |
|---|---|---|---|
| 5,424,782 A | 6/1995 | Aoki | |
| 6,518,970 B1 * | 2/2003 | Glen et al. | 345/501 |
| 2004/0136558 A1 * | 7/2004 | Usuki et al. | 381/394 |
| 2008/0022352 A1 * | 1/2008 | Seo et al. | 725/142 |
| 2008/0111919 A1 | 5/2008 | Hao et al. | |

FOREIGN PATENT DOCUMENTS

| | | |
|---|---|---|
| DE | 10236338 A1 | 2/2004 |
| WO | 2007120927 A2 | 10/2007 |

OTHER PUBLICATIONS

English abstract of DE10236338A1, pub. Feb. 19, 2004.
EP Search Report mailed Jan. 7, 2010.

* cited by examiner

*Primary Examiner* — Ryan R Yang
(74) *Attorney, Agent, or Firm* — Thomas|Kayden

(57) ABSTRACT

Electronic devices with more than one video output terminals and capable of providing distinct videos at different video output terminals. The electronic device comprises first and second display processors driving first and second video output terminals, respectively. The first display processor comprises a blender and a multiplexer. The blender blends a video with image signals, provides a fully-blended video for the first video output terminal, outputs the video, the partly-blended videos and the fully-blended video to the multiplexer. The second display processor is coupled between the output terminal of the multiplexer and the second video output terminal.

19 Claims, 8 Drawing Sheets

US 8,194,100 B2

ELECTRONIC DEVICE

BACKGROUND OF THE INVENTION

1. Field of the Invention

The present invention relates to electronic devices having at least two video output terminals.

2. Description of the Related Art

Electronic devices with at least two video output terminals, such as a dual output set-top box, generally provide the same video at all video output terminals. In a case wherein the first video output terminal is coupled to a television and the second video output terminal is coupled to a video recorder and the user is activating a user interface to select a TV channel, the conventional technique is to provide a video blended with the graphics of the user interface at both the first and second video output terminals. Thus, the video recorder records not only the television program but also the graphics of the user interface.

However, users usually only want to record the television program and don't want the recorded video comprising the graphics of the user interface. Thus, novel techniques capable of providing distinct videos at different video output terminals are called for.

BRIEF SUMMARY OF THE INVENTION

The invention discloses electronic devices with more than one video output terminal, wherein distinct videos are provided at different video output terminals. In additional to first and second video output terminals, the electronic device comprises a first display processor and a second display processor, wherein the first display processor comprises a blender and a multiplexer. The blender blends a video with a plurality of image signals to generate a fully-blended video and a plurality of partly-blended videos. Driven by the first display processor, the first video output terminal outputs the fully-blended video. The multiplexer has a plurality of input terminals and an output terminal, wherein the input terminals receive the video, the partly-blended videos and the fully-blended video. The second display processor is coupled between the output terminal of the multiplexer and the second video output terminal.

In some embodiments, the electronic device further comprises a scaling module coupled between the multiplexer and the second display processor. The video at the output terminal of the multiplexer is scaled down by the scaling module to be outputted at the second video output terminal by the second display processor. In such cases, the first and second video output terminals output videos of different video definitions.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description comprises embodiments carrying out the invention. This description is made for the purpose of illustrating the general principles of the invention and should not be taken in a limiting sense. The scope of the invention is best determined by reference to the appended claims.

Figure 1:
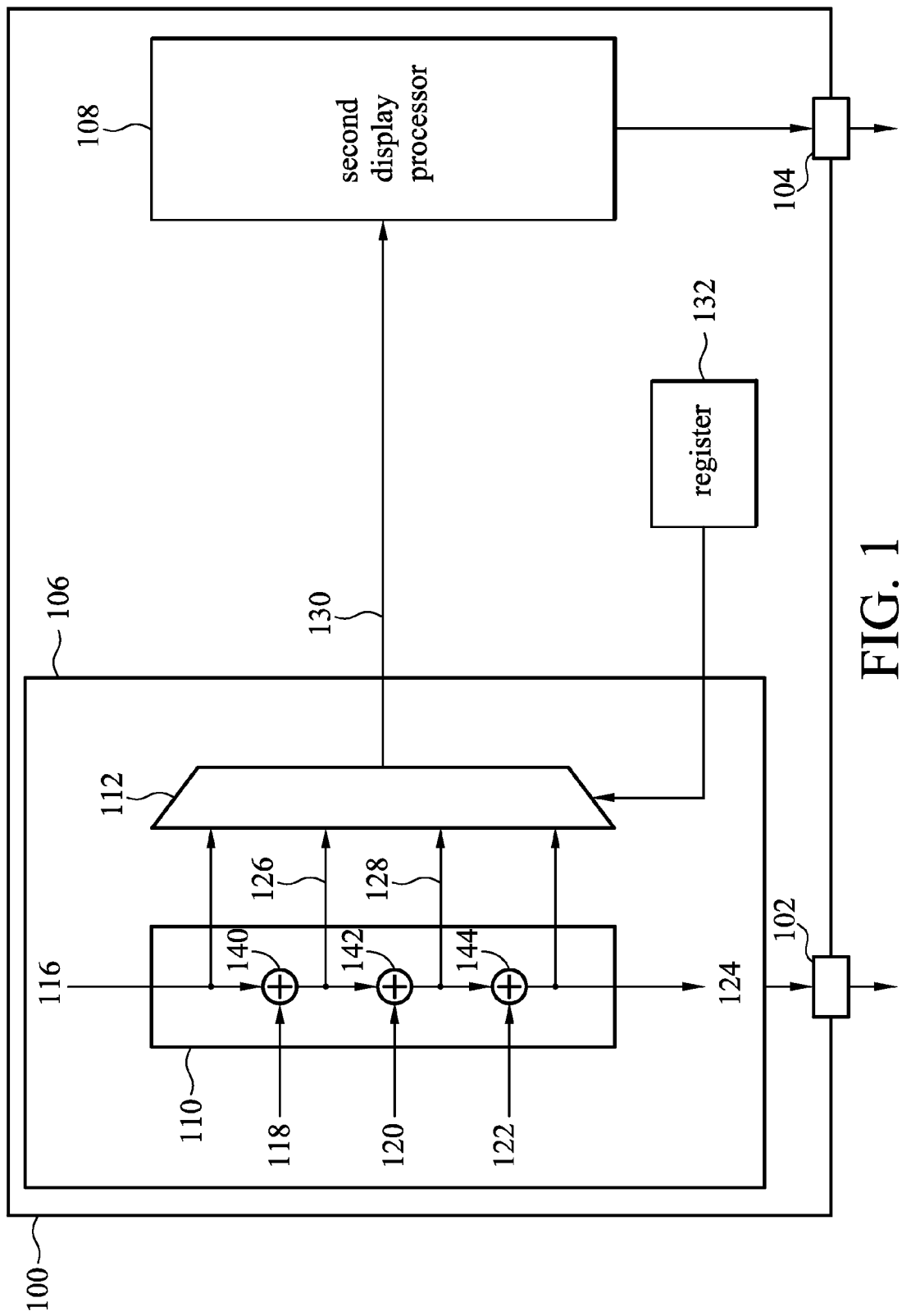
FIG. 1 illustrates an embodiment of the electronic device of the invention.

FIG. 1 illustrates an embodiment of the electronic device of the invention. The electronic device 100 has at least two video output terminals 102 and 104, and comprises a first display processor 106 and a second display processor 108. The first display processor 106 comprises a blender 110 and a multiplexer 112. The blender 110 blends a video 116 with a plurality of image signals 118, 120 and 122 to generate a fully-blended video 124 and partly-blended videos 126 and 128. The partly blended video 126 may comprise the video 116 and the image signal 118. The contents of the partly blended video 128 may be dependent on a user setting. In a first case, the partly blended video 128 may comprise the video 116 and the image signal 120. In a second case, the partly blended video 128 may comprise the video 116 and the image signals 118 and 120. The multiplexer 112 receives the video 116, the fully-blended video 124 and the partly-blended videos 126 and 128, and outputs one of them as a selected video 130 to the second display processor 108. The first and second display processors 106 and 108 are coupled to the first and second video output terminals 102 and 104, respectively, to output the fully-blended video 124 and the selected video 130.

The multiplexer 112 may be controlled by a register 132. According to the setting of the register 132, the first and second video output terminals 102 and 104 may both output the fully-blended video 124, or output distinct videos (for example, the first video output terminal 102 outputs the fully-blended video 124 and the second video output terminal 104 outputs the video 116 or one of the partly-blended videos 126 or 128).

The image signals 118-122 may be graphics, or videos of other programs (named secondary videos). The graphic may be the caption of a TV program, or the user interface called by the user via a remote control, etc. The secondary video is to be blended in the video 116 to generate a Picture in picture (PIP) video. The number of the image signals is not limited to 3. The register may be set to a fixed value when manufactured, or may be set by a user via a user interface.

Figure 2:
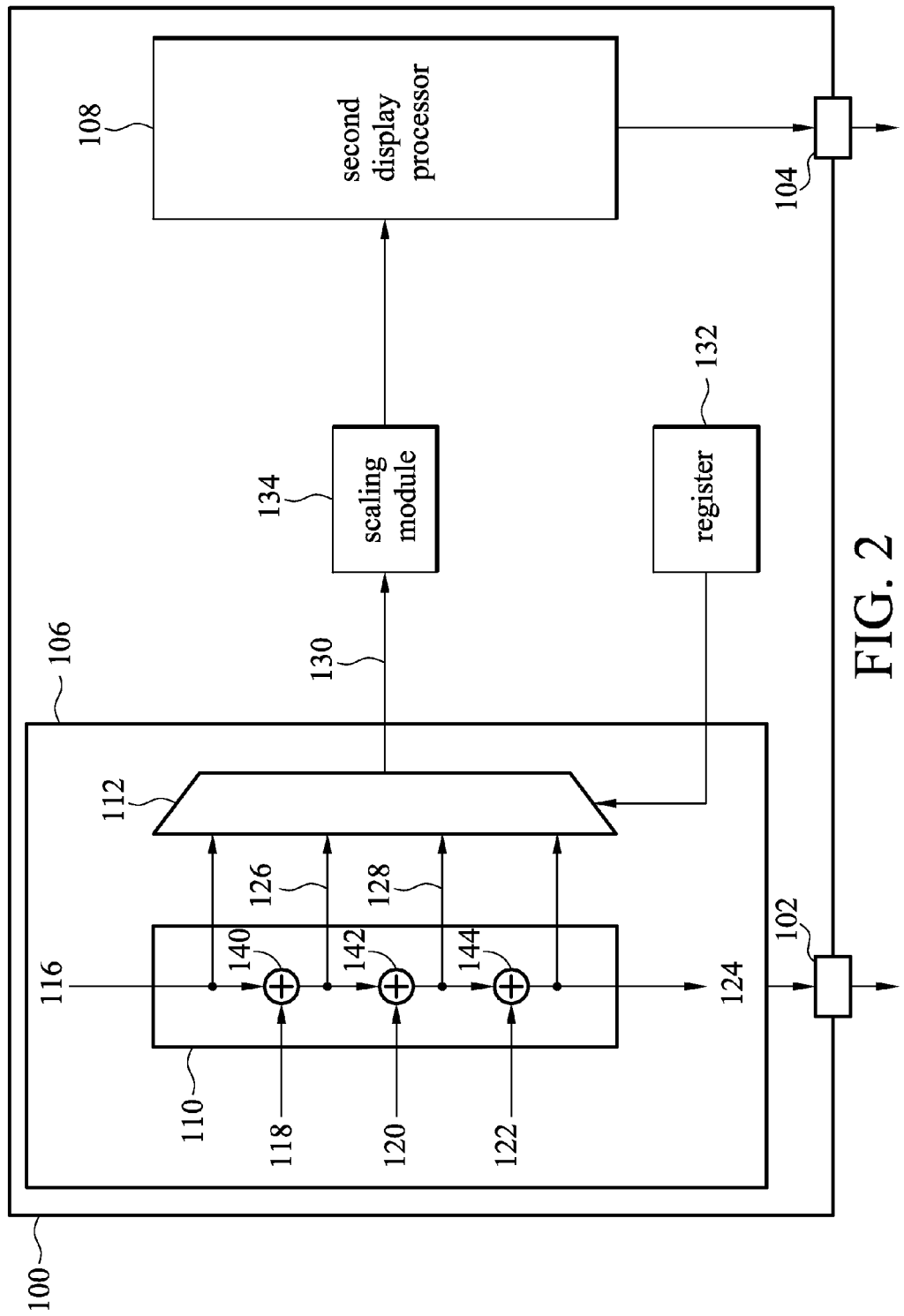
FIG. 2 illustrates another embodiment of the electronic device of the invention.

In the embodiment shown in FIG. 1, the first and second video output terminals 102 and 104 output videos of the same video definition. The invention further discloses electronic devices outputting videos of different video definitions. FIG. 2 illustrates one embodiment of them. Compared with FIG. 1, FIG. 2 further comprises a scaling module 134. The scaling module 134 scales down the selected video 130. Thus, the first and second video output terminals 102 and 104 output videos of distinct video definition (for example, the first video output terminal 102 may output a high-definition video and the second video output terminal 104 may output a standard-definition video).

Figure 6:
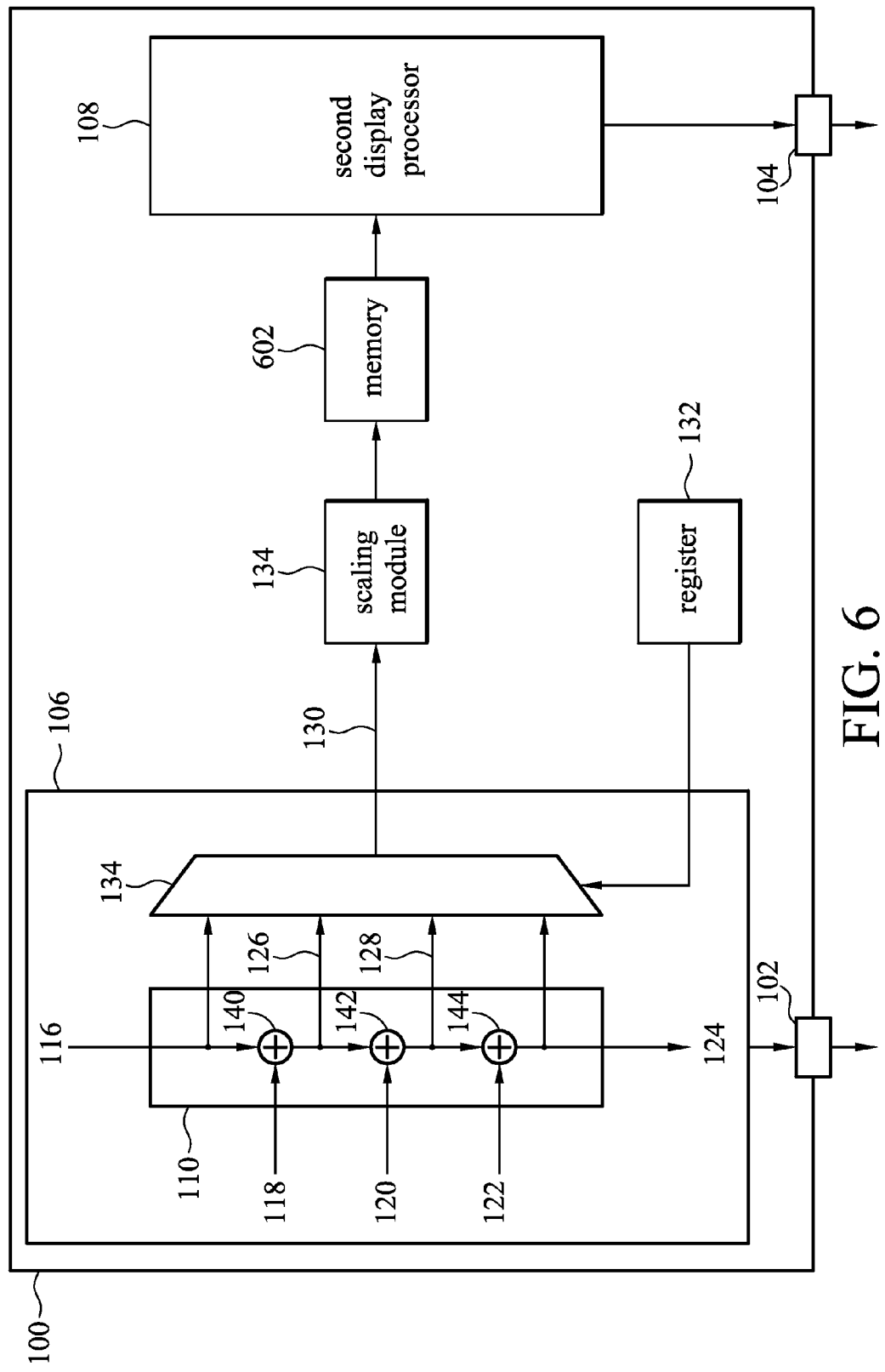
FIG. 6 illustrates another embodiment of the electronic device of the invention.

FIG. 6 illustrates another embodiment of the electronic device of the invention. Compared with FIG. 2, FIG. 6 further comprises a memory 604.

Figure 3:
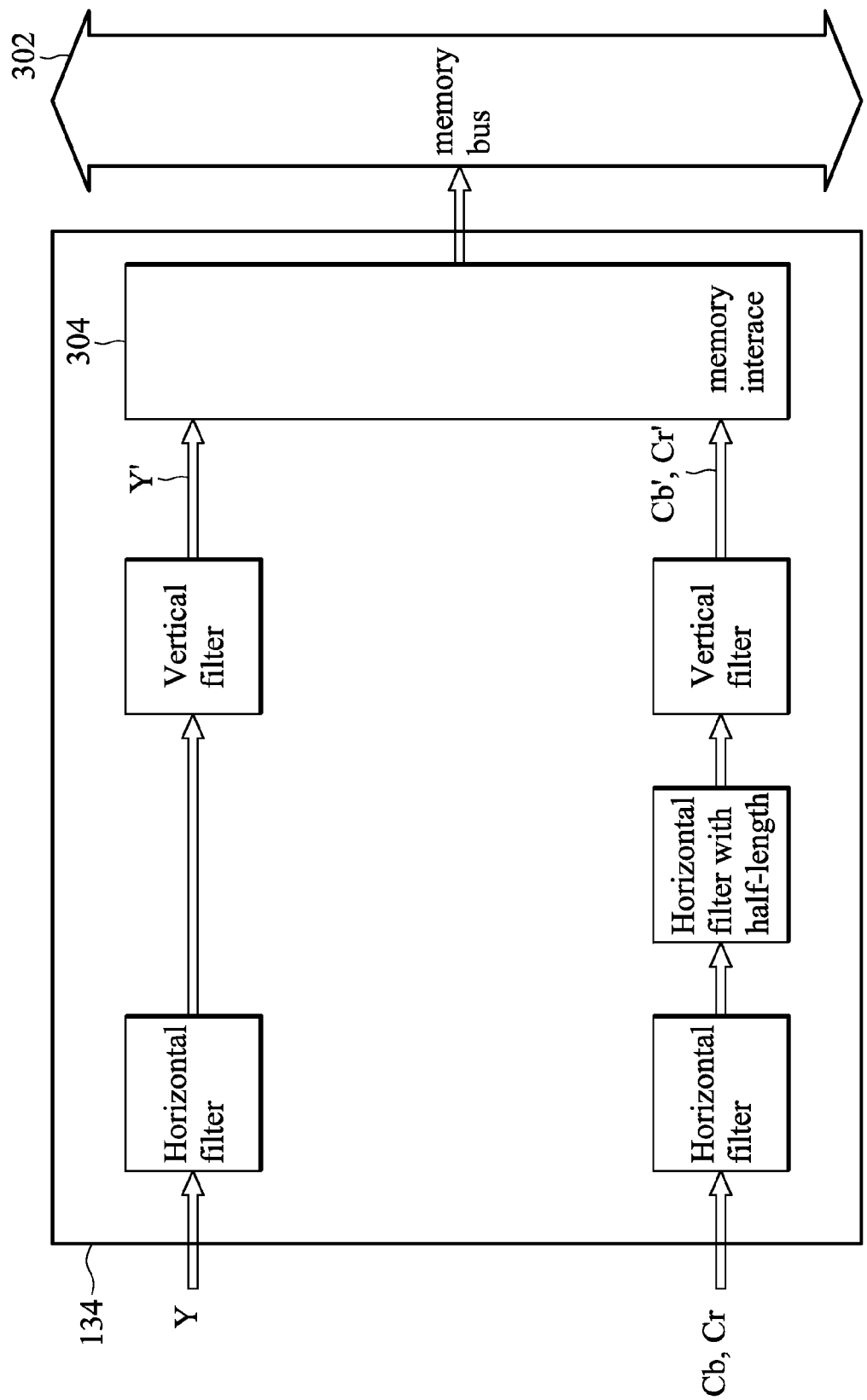
FIG. 3 illustrates an embodiment of the scaling module of the invention.

FIG. 3 illustrates an embodiment of the scaling module 134. In this embodiment, the video is of a YUV format (YCbCr). Y is the luma component, and Cb and Cr are the blue-difference and red-difference chroma components. As shown in FIG. 3, the data Y, Cb and Cr of the video 130 may be captured frame by frame (or field by field). The scaling module 134 scales down the captured frame to generate the scaled-down result Y', Cb' and Cr' and sends them to a memory bus 302 of the electronic device via the memory interface 304. Via the memory bus 302, the data Y', Cb' and Cr' may be interleaved within a memory of the electronic device (such as memory 602 of FIG. 6). In some embodiments, the memory interface 304 controls every write request (writing data Y', Cb' or Cr') to be 4 QW(QW=8 bytes).

Figure 4:
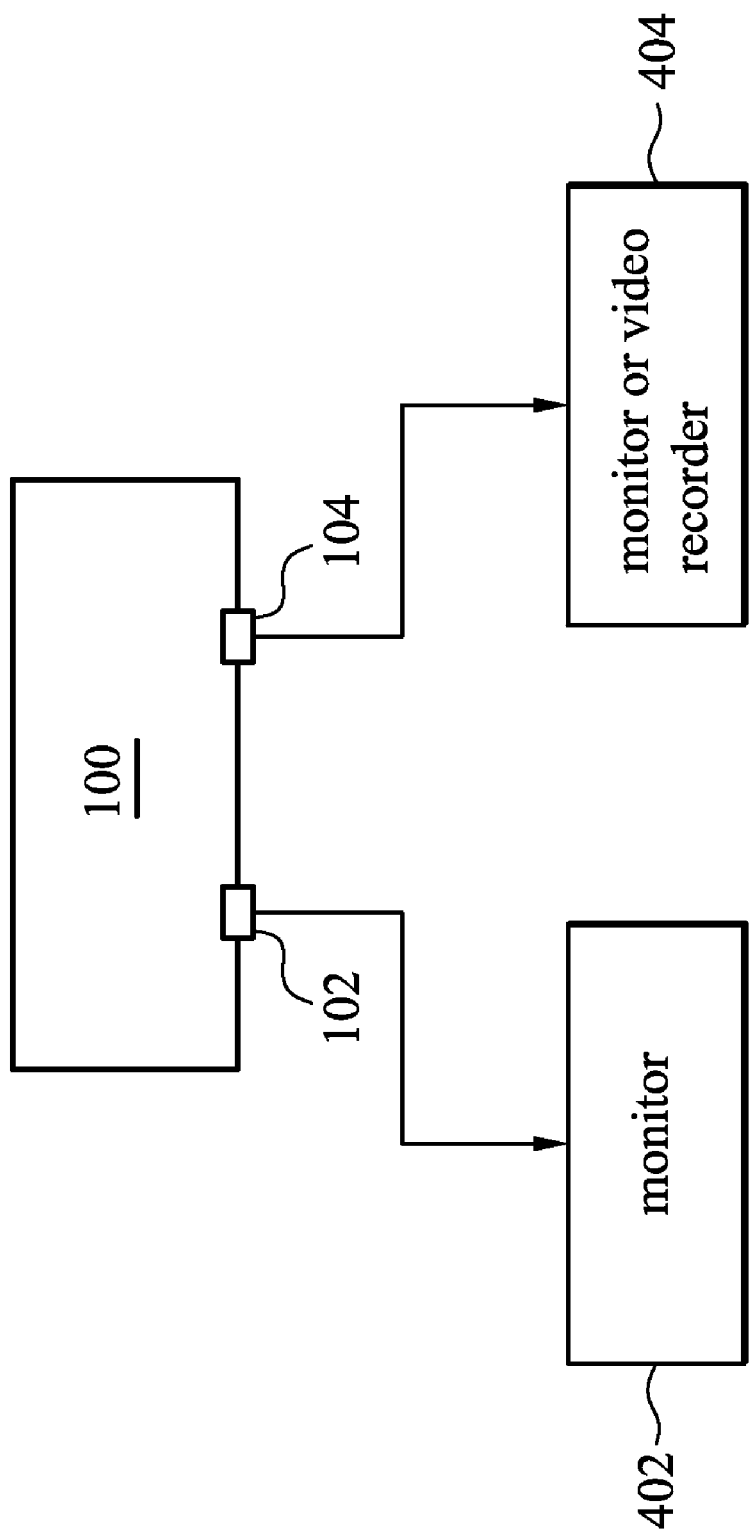
FIG. 4 illustrates an application of the electronic device of the invention.

FIG. 4 illustrates an application of the electronic device of the invention. The electronic device 100 may be used in a set-top box or video players such as a DVD player. As shown in FIG. 4, the first output terminal is coupled to a first monitor 402 and the second output terminal may be coupled to a second monitor or a video recorder (404). Users can use a remote control to call a user interface to communicate with the electronic device 100. By properly setting the register (132 of FIG. 1), the user interface can only be displayed on the first monitor 402 without being outputted through the second video output terminal 104. Thus, a video recorder (404) coupled at the second video output terminal 104 can just record the program without recording the user interface. In a case wherein the electronic device 100 comprises the scaling module (134 of FIG. 2), the monitor 402 may be a high-definition monitor, and the device 404 may be a standard-definition monitor or a standard-definition video recorder.

Figure 5:
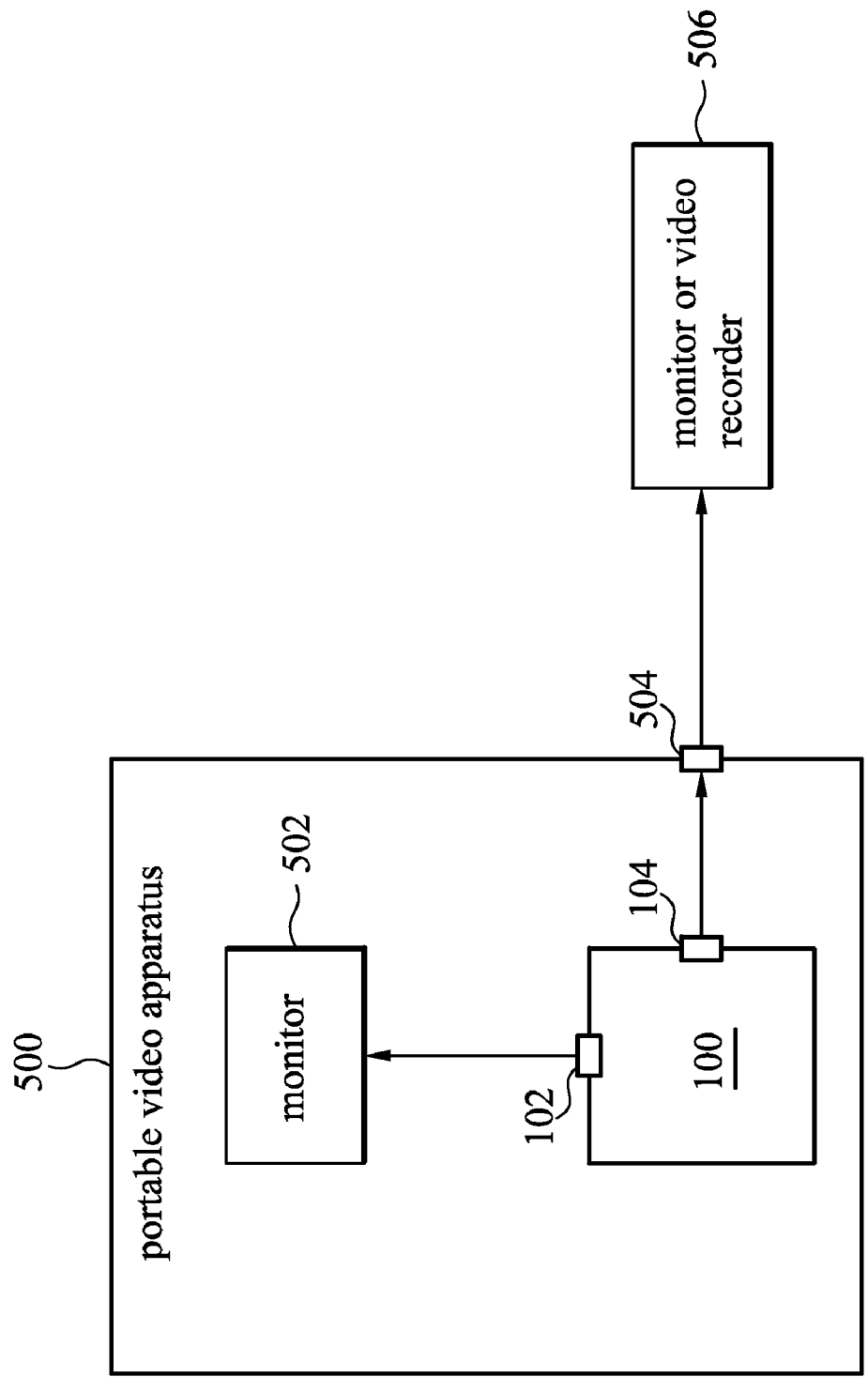
FIG. 5 illustrates a portable video apparatus comprising the electronic device of the invention.

FIG. 5 illustrates a portable video apparatus 500 comprising the electronic device 100. The portable video apparatus 500 may be a portable video player, a video camera, etc, and there is a monitor 502 assembled in the portable apparatus 500. The first video output terminal 102 of the electronic device 100 is coupled to the monitor 502 and a user can communicate with the portable video apparatus 500 by calling a user interface to be shown on the monitor 502. The second video output terminal 104 is coupled to a video output port 504 of the portable video apparatus 500. The video output port 504 is operable to be coupled a monitor or a video recorder (506).

Figure 7:
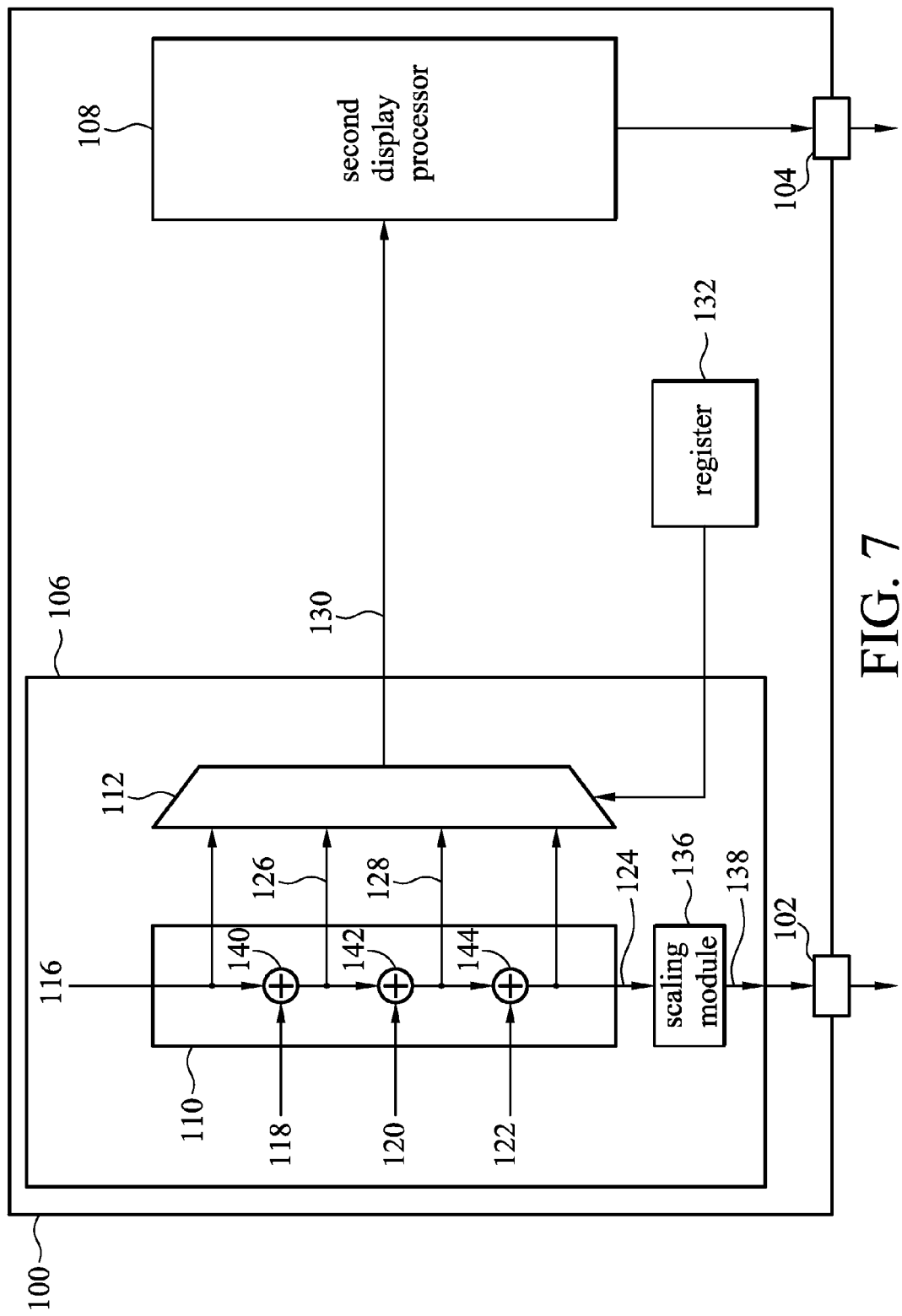
FIG. 7 illustrates another embodiment of the electronic device of the invention.

The size of the monitor 502 may be very small (with low resolution), and the accompanying electronic device 100 should be specially designed. FIG. 7 illustrates an embodiment of the specially designed electronic device 100. Compared with FIG. 1, the first display processor 106 of FIG. 7 further comprises a scaling module 136. The scaling module 136 scales down the fully-blended video 124 to generate a scaled fully blended video 138 to be displayed on the small size monitor 502. The scaling module 136 may be realized by a conventional downsampler or any conventional scaling down techniques. In other embodiments, the scaling module 136 can be added in the first display processor 106 of FIG. 2.

Figure 8:
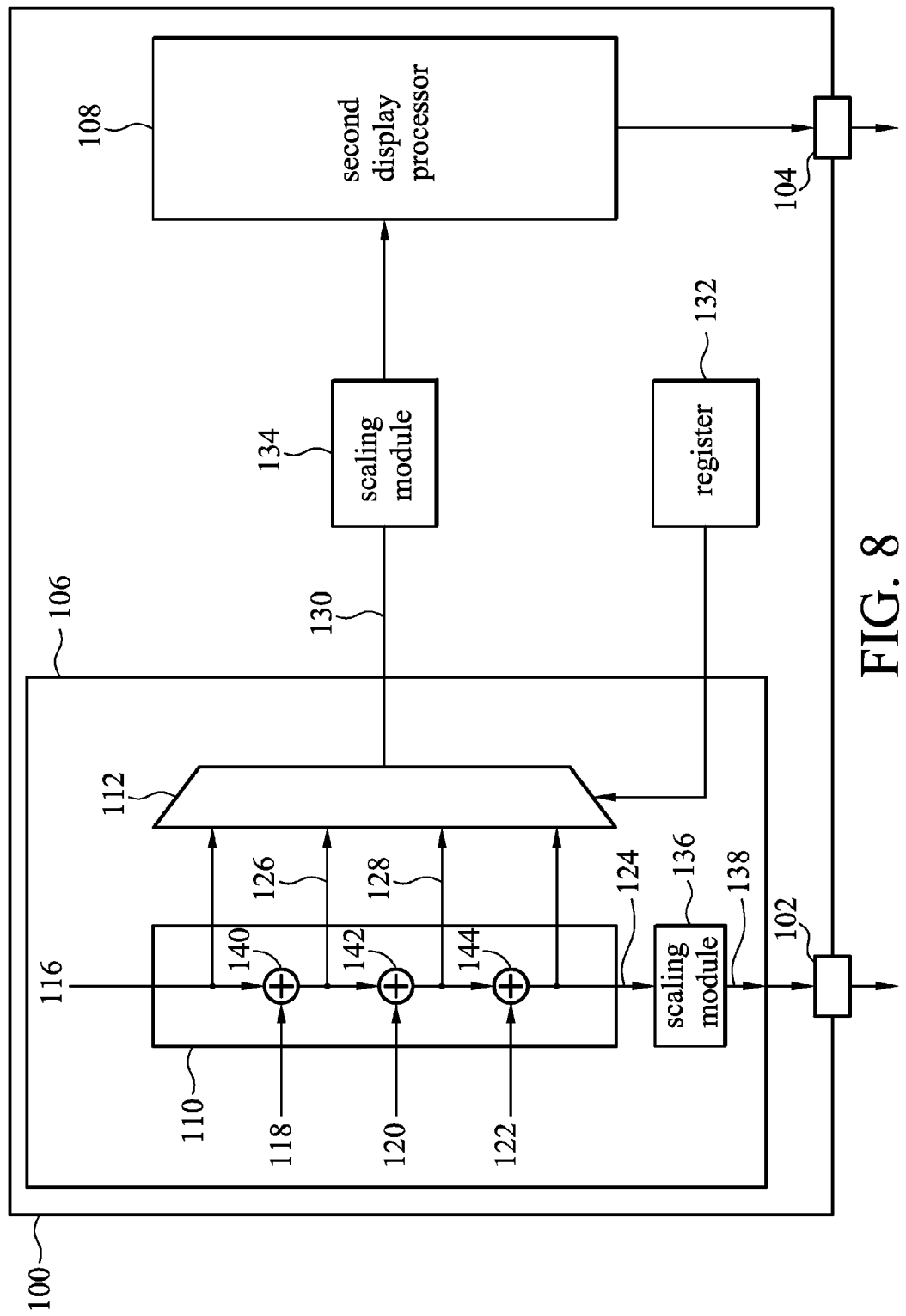
FIG. 8 illustrates another embodiment of the electronic device of the invention.

FIG. 8 illustrates another embodiment of the electronic device of the invention. Compared with FIG. 7, the electronic device 100 of FIG. 8 further comprises a scaling module 134. The two scaling module 134 and 136 may use distinct scaling techniques as well as identical scaling techniques.

Because the blending units 140, 142 and 144 of FIGS. 1, 2 and 6-8 may delay the signals, a synchronization technique is required. To synchronize the input signals of each blending unit 140, 142 or 144, the image signals 118, 120 and 122 are specially designed. For example, the image signal 122 lags the image signal 120, and the image signal 120 lags the image signal 118. In some embodiments, the image signal 118 may be a graphic of subtitle, the image signal 120 may be a graphic of a user interface, and the image signal 122 may be graphic of a cursor. The signals 116, 118, 120 and 122 all follow a specific video standard, such as NTSC or PAL, and are processed pixel by pixel that is only 1 pixel is processed during 1 clock cycle.

U.S. Pat. No. 5,488,385 (thereinafter called Singhal) discloses multiple concurrent display systems, which output distinct programs at different video output terminals. Our invention, however, outputs the same program at different video output terminals. Singhal does not teach the techniques of this application.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a first video output terminal;
   a second video output terminal;
   a first display processor comprising a blender and a multiplexer, wherein the blender blends a video with a plurality of image signals to generate a fully-blended video and a plurality of partly-blended videos, and the multiplexer has a plurality of input terminals and an output terminal, the input terminals receiving the video, the partly-blended videos and the fully-blended video; and
   a second display processor, coupled between the output terminal of the multiplexer and the second video output terminal,
   wherein the first display processor is further coupled to the first video output terminal to output the fully-blended video.

2. The electronic device as claimed in claim 1, further comprising a register for controlling the multiplexer, wherein the register is set to a fixed value when manufactured, or is set by a user via a user interface.

3. The electronic device as claimed in claim 1, further comprising a memory coupled between the output terminal of the multiplexer and the second display processor.

4. The electronic device as claimed in claim 1, wherein the first display processor further comprises a first scaling module, and the fully-blended video is scaled down by the first scaling module before being outputted through the first video output terminal.

5. The electronic device as claimed in claim 4, further comprising a second scaling module coupled between the multiplexer and the second display processor.

6. The electronic device as claimed in claim 5, wherein the first video output terminal is coupled to a first monitor and the second video output terminal is coupled to a second monitor or a video recorder.

7. The electronic device as claimed in claim 5, embedded in a portable video apparatus.

8. The electronic device as claimed in claim 7, wherein the first video output terminal is coupled to a monitor assembled in the portable video apparatus, and the second video output terminal is coupled to a video output port of the portable video apparatus.

9. The electronic device as claimed in claim 4, wherein the first video output terminal is coupled to a first monitor and the second video output terminal is coupled to a second monitor or a video recorder.

10. The electronic device as claimed in claim 4, embedded in a portable video apparatus.

11. The electronic device as claimed in claim 10, wherein the first video output terminal is coupled to a monitor assembled in the portable video apparatus, and the second video output terminal is coupled to a video output port of the portable video apparatus.

12. The electronic device as claimed in claim 1, further comprising a second scaling module coupled between the multiplexer and the second display processor.

13. The electronic device as claimed in claim 12, wherein the first video output terminal is coupled to a high-definition monitor and the second video output terminal is coupled to a standard-definition monitor or a standard-definition video recorder.

14. The electronic device as claimed in claim 12, embedded in a portable video apparatus.

15. The electronic device as claimed in claim 14, wherein the first video output terminal is coupled to a monitor assembled in the portable video apparatus, and the second video output terminal is coupled to a video output port of the portable video apparatus.

16. The electronic device as claimed in claim 1, wherein the first video output terminal is coupled to a first monitor and the second video output terminal is coupled to a second monitor or a video recorder.

17. The electronic device as claimed in claim 1, embedded in a portable video apparatus.

18. The electronic device as claimed in claim 17, wherein the first video output terminal is coupled to a monitor assembled in the portable video apparatus, and the second video output terminal is coupled to a video output port of the portable video apparatus.

19. The electronic device as claimed in claim 1, wherein the image signal is a graphic, or a secondary video for Picture in picture (PIP).

* * * * *